United States Patent
Finch et al.

(10) Patent No.: US 7,322,659 B2
(45) Date of Patent: Jan. 29, 2008

(54) METHOD AND SYSTEM FOR BRAKE DISTRIBUTION IN A REGENERATIVE BRAKING SYSTEM

(75) Inventors: Michael D. Finch, Perry, MI (US); Timothy M. Karnjate, Grand Blanc, MI (US); Kevin S. Kidston, New Hudson, MI (US); William K. Manosh, White Lake, MI (US); Kurtis C. Minney, Howell, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 292 days.

(21) Appl. No.: 11/197,284

(22) Filed: Aug. 4, 2005

(65) Prior Publication Data

US 2007/0029874 A1 Feb. 8, 2007

(51) Int. Cl.
*B60T 8/64* (2006.01)
(52) U.S. Cl. .................................................. 303/152
(58) Field of Classification Search ................ 303/152, 303/113.5, 9.62, 9.69, 9.71
See application file for complete search history.

(56) References Cited

U.S. PATENT DOCUMENTS

| 6,454,364 | B1 * | 9/2002 | Niwa et al. ................. 303/152 |
| 6,598,945 | B2 * | 7/2003 | Shimada et al. ............. 303/152 |
| 6,811,229 | B2 * | 11/2004 | Soga .......................... 303/152 |
| 6,988,779 | B2 * | 1/2006 | Amanuma et al. ........... 303/152 |
| 2002/0180262 | A1 * | 12/2002 | Hara et al. ................ 303/119.1 |
| 2002/0180266 | A1 * | 12/2002 | Hara et al. ................... 303/152 |
| 2004/0070270 | A1 * | 4/2004 | Gunji .......................... 303/152 |
| 2004/0090116 | A1 * | 5/2004 | Tsunehara ................... 303/152 |
| 2005/0104445 | A1 * | 5/2005 | Choi .......................... 303/152 |
| 2006/0055239 | A1 * | 3/2006 | Crombez et al. ........... 303/152 |

* cited by examiner

*Primary Examiner*—Devon Kramer

(57) ABSTRACT

A braking distribution system is provided for system with a front regenerative braking system and a rear regenerative braking system. The system comprises a brake controller coupled to the front regenerative braking system and the rear regenerative braking system, and the brake controller is configured to receive a braking request, a first amount of braking that is available from the front regenerative braking system, and a second amount of braking that is available from the rear regenerative braking system. The controller is also configured to calculate a front base braking based at least in part on the braking request and a front base braking distribution, calculate a rear base braking based at least in part on the braking request and a rear base braking distribution, and determine a front regenerative braking request and a rear regenerative braking request based on the first amount and the second amount.

13 Claims, 2 Drawing Sheets

METHOD AND SYSTEM FOR BRAKE DISTRIBUTION IN A REGENERATIVE BRAKING SYSTEM

TECHNICAL FIELD

The present invention generally relates to the field of braking systems for automobiles, and more particularly relates to a method and system for brake distribution in a regenerative braking system of an automobile.

BACKGROUND OF THE INVENTION

As the demand for automobile fuel efficiency increases, the demand increases for automobiles that are at least partly driven by an electric motor. Such vehicles include electric motor vehicles that are powered by a battery, parallel hybrid vehicles that use an internal combustion engine in tandem with an electric motor, and serial hybrid vehicles that use a battery-powered electric motor and a secondary power source (e.g., a fuel cell) to recharge the battery.

One feature of these fuel efficient automobiles, which is commonly utilized to assist with batter charging, is regenerative braking. In regenerative braking, the electric motor applies resistance to the drive train to slow the rotation of one or more wheels. The energy from the rotation of the one or more wheels turns a motor that can charge the battery.

In a typical situation, braking in a hybrid vehicle is accomplished with a combination of braking systems. For example, braking is accomplished with a friction braking system and an electro-mechanical braking system that at least partially utilizes the regenerative braking system. When combining these two systems, vehicle stability is desirable while maximizing the amount of recaptured kinetic energy.

Accordingly, it is desirable to provide systems for modifying brake distribution in a regenerative braking system. In addition, it is desirable to provide methods for modifying brake distribution in a regenerative braking system. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A braking distribution system is provided in accordance with an exemplary embodiment of the present invention. The system comprises a regenerative braking system configured to receive a front regenerative braking request and a rear regenerative braking request, and a brake controller coupled to the regenerative braking system. The brake controller is configured to receive a braking request, a first amount of braking that is available from the regenerative braking on the front axle, and a second amount of braking that is available from the regenerative braking on the rear axle. The brake controller is also configured to calculate a front base braking based at least in part on the braking request and a front base braking distribution, calculate a rear base braking based at least in part on the braking request and a rear base braking distribution, determine a front regenerative braking request based on the first amount of braking and the front base braking, determine a rear regenerative braking request based on the second amount of braking and the rear base braking, and transmit the front regenerative braking request to the front regenerative braking system and the rear regenerative braking request to the rear regenerative braking system.

In addition to the system, a braking distribution method is provided in accordance with one exemplary embodiment. The method comprises receiving a braking request, a first amount of braking that is available from the front regenerative braking system, and a second amount of braking that is available from the rear regenerative braking system. In addition, the method comprises calculating a front base braking based at least in part on the braking request and a front base braking distribution, calculating a rear base braking based at least in part on the braking request and a rear base braking distribution, determining a front regenerative braking request based on the first amount of braking and the front base braking, and determining a rear regenerative braking request based on the second amount of braking and the rear base braking.

DESCRIPTION OF THE DRAWINGS

The present invention will hereinafter be described in conjunction with the following drawing figures, wherein like numerals denote like elements, and.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
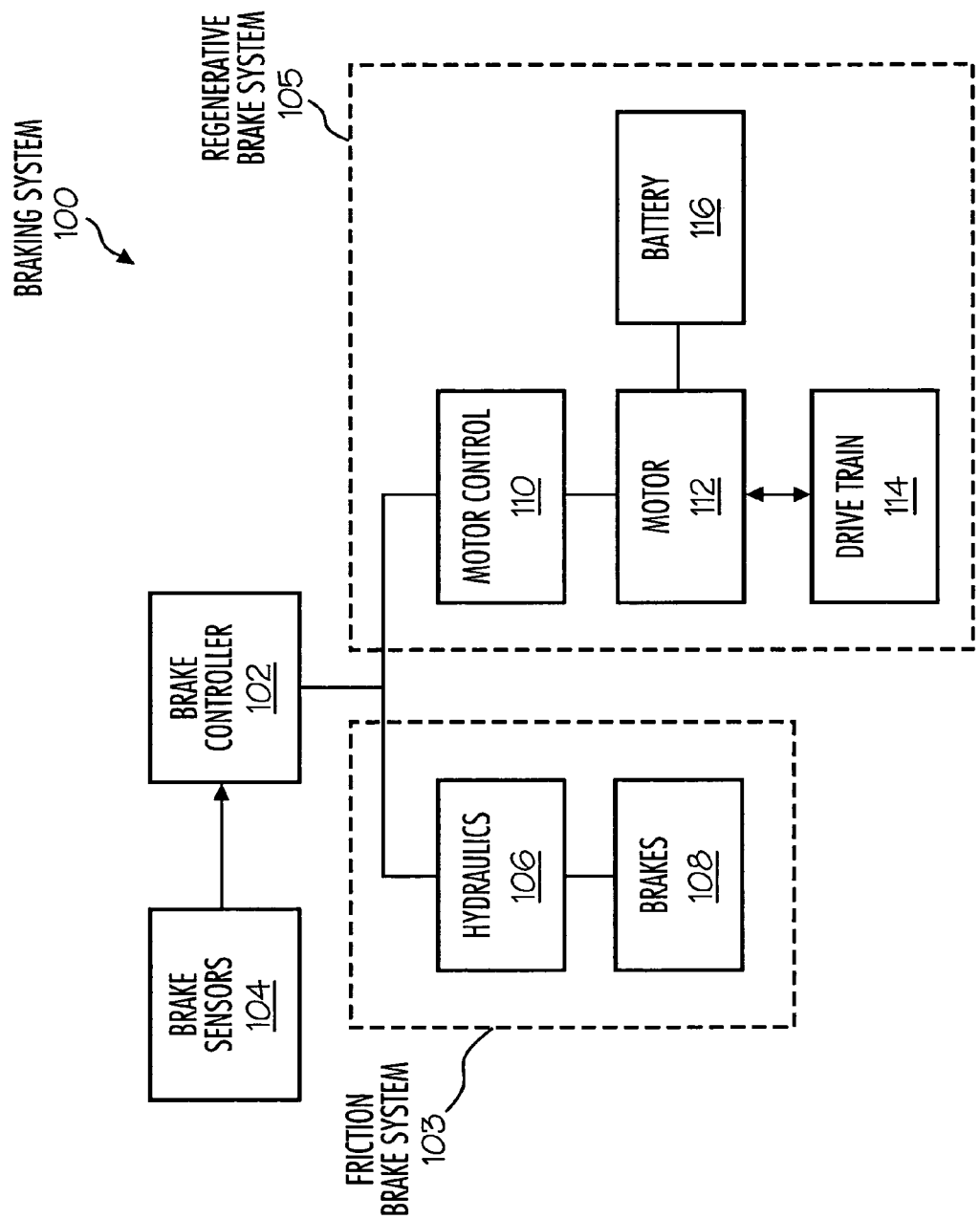
FIG. 1 is block diagram of a regenerative braking system in accordance with an exemplary embodiment of the present invention.

FIG. 1 is a block diagram of a braking system 100 in accordance with an exemplary embodiment of the present invention. The braking system 100 can be used in any number of vehicles, such as a hybrid automobile. Braking system 100 includes a brake controller 102 coupled to a friction brake system 103 and a regenerative brake system 105. The brake controller 102 is coupled to a hydraulic system 106, the hydraulic system 106 is coupled to brake(s) 108, the brake controller 102 is coupled to a motor controller 110, the motor controller 110 is coupled to a motor 112, and the motor 112 is coupled to a drive train 114 and a battery 116.

Brake controller 102 can be any controller suitable for receiving inputs from a brake sensor 104 and also suitable for providing an output to the friction brake system 103 and the regenerative brake system 105. Brake sensor 104 can include inputs for a brake pedal switch (not shown) that is configured to provide an indication of the brake pedal position. The Brake sensor 104 can also include inputs for a brake pressure transducer (not shown) that is configured to provide an indication of the extent of the pressure applied to the brake pedal and further include inputs for a brake pedal travel sensor that is configured to provide an indication of movement in the brake pedal.

Brake system 103 can receive braking commands from brake controller 102. These commands can be received by the hydraulic system 106 of the brake system 103 and the hydraulic system 106 can include any necessary hydraulic component such as a master cylinder, actuators, valves, hydraulic lines and the like that are needed to implement a braking system, such as a friction braking system. In one exemplary embodiment, the braking commands generated by the brake controller 102 are used to operate the hydraulic system 106. Alternatively, hydraulic system 106 can also be represented as a brake by wire system utilizing electronic application and control of the brake(s) 108.

Brake(s) 108 can be any number of brake configurations such as disk brakes where hydraulically operated calipers can be applied to a brake disk to induce friction and assist in slowing or ceasing motion of an automobile. Brake(s) 108 can also be other friction brakes such as drum brakes or a combination of disk and drum brakes. Alternatively, brakes 108 can be any wheel torque generating device operating in a braking capacity.

Regenerative brake system 105 receives braking commands from brake controller 102 and provides braking torque using the electric motor 112. Commands from brake controller 102 can be received at motor controller 110, and motor controller 110 can be any controller capable of generating commands for motor 112 in response to various inputs. Motor controller 110 can also receive a request for regenerative braking from brake controller 102 and motor controller 110 can output a command to place motor 112 into a regenerative braking state in response to the request.

Motor 112 drives at least one of the wheels and preferably more than one of the wheels when the automobile is operating under battery power. For example, motor 112, in an automobile with only a rear regenerative braking system, one motor that drives both wheels of the rear axle. In an automobile with only a rear regenerative braking system, one motor drives both wheels of the front axle. As an alternate example, an automobile may have a regenerative braking system the includes both a rear regenerative braking system and a front regenerative braking system. In this embodiment, two motors can be used with one of the motors powering each wheel while in a rear wheel drive configuration and the other motor powering each wheel while in a front wheel drive configuration. In an all wheel drive configuration, one or more motors can be provided for the wheels in the front and the back or multiple motors can be used internal to a transmission to power front, rear, or front and rear wheels.

Motor 112 can also generate energy to charge the battery 116. When the motor 112 is in a regenerative braking state, the motor 112 will provide resistance to the drive train 114. The rotation of the wheels coupled to the drive train 114 causes mechanisms of the motor 112 to rotate such that the motor 112 behaves like a generator and generates energy that can be used to charge battery 116 in accordance with the system and methods of the present invention.

Figure 2:
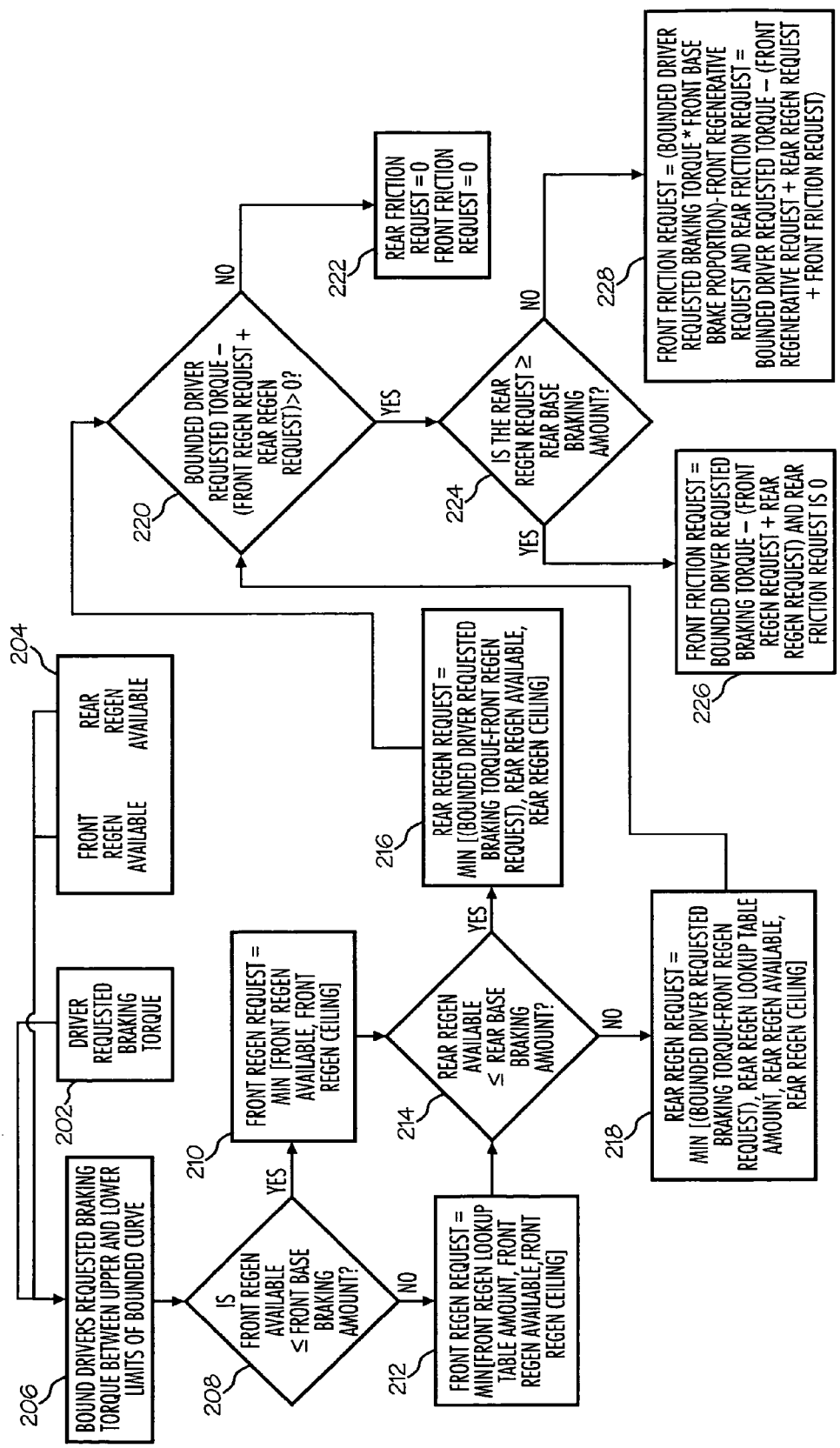
FIG. 2 is a flowchart of a method to distribute braking torque in accordance with an exemplary embodiment of the present invention.

For example, in accordance with one exemplary embodiment of the present invention, a method for brake distribution is shown in FIG. 2 that utilizes the regenerative braking state of the motor. This method is preferably executed by brake controller 102, and the brake controller 102 preferably transmits braking commands to the friction brake system 103 and regenerative brake system 105.

Referring to FIG. 2, the driver requests brake torque (i.e., braking) in step 202. This is typically done with the driver applying pressure to a brake pedal. Brake sensor 104 determines the brake position and the force exerted on the brake pedal, and this data is provided to the brake controller 102. Once the amount of driver requested braking is determined in step 202, a front regenerative braking available and a rear regenerative braking available (i.e., a second amount of braking that is available from the rear regenerative braking system) is determined in step 204.

The front regenerative braking available and rear regenerative braking available are the calculated maximum amount of braking torque that can be provided by the front regenerative braking system and the rear regenerative braking system (i.e., an amount of braking that is available from the front regenerative braking system and an amount of braking that is available from the rear regenerative braking system). These amounts are typically determined by the regenerative brake system 105, and depend on many factors, such as the state of charge of the battery and the current speed of the automobile. In embodiments where regenerative braking is limited to a single axle, the rear regenerative braking available or the front regenerative braking available can be zero, depending on which axle does not have regenerative braking. The front regenerative braking available and the rear regenerative braking available are preferably provided to the brake controller 102.

A bounded driver requested braking torque is determined by referencing the driver requested braking torque against a bounded braking curve in step 206. The bounded braking curve provides an upper and lower bound for a total torque request. The lower bound detects misreading of driver intent due to sensor error by ignoring negative braking requests or braking requests lower than the functional limitations of the hardware. The upper bound is set to a value that exceeds the actual braking capability of the vehicle to ensure that the driver will be able to lock all four wheels.

To determine the driver bounded request, the driver requested braking torque is received and compared to the upper and lower bounds. If the request falls between the upper and lower limits of the bounded braking curve, the request passes through as received without alteration. If the request is above the upper limit, the request passes through either as the upper limit value or a pre-selected default amount, and if the request is below the lower limit, it passes through as request of zero torque. Therefore, a driver braking request can be the bounded driver requested braking torque in accordance with one exemplary embodiment.

After step 206, it is determined if the front regenerative braking available is less than or equal to a front base braking amount in step 208. The front base braking amount is based on a predetermined base braking proportion between the front brakes and the rear brakes. For example, in one exemplary embodiment, the base braking proportion may be 60% front and 40% rear. If this base braking proportion exists and if the total requested brake torque is 10,000 ft-lbf, the front base braking amount is 6,000 ft-lbf (i.e., 60% of 10,000 ft-lbf). The determination of the front base braking amount can be based on any number of factors such as vehicular architecture.

If the front regenerative braking available is less than or equal to the front base braking amount as shown in step 210, the front regenerative braking request is set equal to the minimum of the front regenerative braking available as determined in step 204 or an overall ceiling limit for front regenerative braking. The overall ceiling limit for front regenerative braking represents a maximum amount of regenerative braking that will be applied to the front wheels. The overall ceiling limit is again specific to the type of automobile and other design factors.

If the front regenerative braking that is available is greater than the front base braking amount, the front regenerative braking request is set equal to the minimum (i.e., lesser) of a front regenerative amount that can be provided in a lookup table, the front regenerative braking available, or the overall ceiling limit for front regenerative braking (step 212). The front regenerative amount is a braking amount that represents a maximum allowable front axle torque for a given deceleration, and this value can be determined using the driver requested braking torque in conjunction with other factors. The determination can be accomplished with a look-up table in accordance with one exemplary embodiment, and the look-up table can match the driver requested braking torque with a front regenerative braking amount. This maximum allowable front axle torque is higher than the base braking amount and can be limited by the overall ceiling for front regenerative braking. The look-up table values can be generated using any number of known techniques of the determination can be accomplished with techniques other than a look-up table.

Once the front regenerative braking is determined, the rear regenerative braking is calculated that begins with a comparison to determine if the rear regenerative braking available is less than or equal to a rear base braking amount as shown in step 214. The rear base braking amount is a proportion of the total braking that should be applied to-the rear brakes. Continuing with the previous example, if the total braking torque is 10,000 ft-lbf and the base rear braking proportion is 40%, the rear base braking amount is 4,000 ft-lbf (i.e., 40% of 10,000 ft-lbf). If the rear regenerative braking that is available is less than or equal to the rear base braking amount, the rear regenerative braking request is selected in step 216 as the minimum of the bounded driver brake request less the front regenerative braking request, the rear regenerative braking available, or the overall ceiling limit for rear regenerative braking is selected as the rear regenerative braking request. The overall ceiling limit for rear regenerative braking is typically selected based on the type of automobile, weight distribution and the like. The overall ceiling limit for rear regenerative braking represents the maximum regenerative braking torque that is allowed on the rear wheels for a particular automobile. The overall ceiling limit for rear regenerative braking is again generally specific to the type of automobile and other factors.

If the rear regenerative braking available is greater than the rear base braking amount, the rear regenerative braking request is selected in step 218 as the minimum of the bounded driver braking request less the front regenerative braking request, the rear regenerative braking available, a rear regenerative amount, or a overall ceiling limit for rear regenerative braking. The rear regenerative amount is a braking amount determined by using the driver requested braking torque in conjunction with, in one exemplary embodiment, a look-up table, to determine a maximum allowable rear braking amount for a given deceleration that results in acceptable vehicle stability. The look-up table can match the driver requested braking torque with a maximum rear axle torque for a given braking amount.

Once the front regenerative braking torque and the rear regenerative braking torque are determined, the amount of front and rear friction braking torque needed is calculated beginning with step 220. In step 220, it is determined if the bounded driver braking request less the front regenerative braking request and less the rear regenerative brake request is greater than zero. In other words, in step 220, it is determined if there is any more requested brake torque to allocate. If there is no more braking torque to distribute, the rear friction braking request is zero and the front friction braking request is zero in step 222.

If there is additional driver requested brake torque to be allocated after fulfilling the front regenerative braking request and the rear regenerative brake request as shown in step 224, it is determined if the rear regenerative braking request is greater than or equal to the base rear braking amount. If the rear regenerative braking request is greater than or equal to the base rear braking amount, then no more braking torque will be allocated to the rear wheels and any remaining required braking torque will be provided by the front friction brakes as shown in step 226. In other words, the front friction braking request will be equal to the bounded driver braking request less the front regenerative braking request and less the rear regenerative braking request. Also, the rear friction braking request is set to zero in step 226.

If the rear regenerative braking request is less than the base rear braking amount, then the remaining required brake torque is split over the front and rear friction brakes based on the base brake proportioning curve, which is the same proportion used to determine the front base brake request and the rear base brake request, in step 228. Specifically, the front friction braking request is equal to the bounded driver braking request multiplied by the front base braking proportion less the front regenerative braking request. The rear friction braking request will be the remainder. In other words, rear friction braking request is the bounded driver braking request less the total of the front regenerative braking request and the rear regenerative braking request and the front friction braking request.

As an example, assume that the driver requests 10,000 ft-lbf of torque. Also, assume that the front regenerative braking available is 1500 ft-lbf and rear regenerative braking available is 1500 ft-lbf. Further, assume that the base curve has a minimum of 0 ft-lbf and a maximum of 6,000 ft-lbf. Thus, the bounded driver braking request is 6,000 ft-lbf. Also, assume that the base front to rear brake proportion is 60% front and 40% rear. Thus, the base front braking torque is (6,000 ft-lbf) (60%)=3,600 ft-lbf and the base rear braking torque is 2,400 ft-lbf.

With these assumptions and returning to step 208, the front regenerative torque available (1,500 ft-lbf) is less than the front base brake torque (3,600 ft-lbf). Thus, the front regenerative braking request is the minimum of the front regenerative braking available (1,500 ft-lbf) or the ceiling limit of the front regenerative braking, which in this case we will assume to be 1,000 ft-lbf as shown in step 210. Thus, the front regenerative braking request is 1,000 ft-lbf.

Then, it is determined if the rear regenerative braking available is less than the base rear braking torque in step 214. The rear regenerative braking available is 1,500 ft-lbf and the base rear braking amount is 2,400 ft-lbf. Thus, the rear regenerative braking available is less than the base rear braking amount. Therefore, the rear regenerative braking request is the minimum of the bounded driver braking request less the front regenerative torque requested (6,000 ft-lbf−1,000 ft-lbf=5,000 ft-lbf) or the ceiling limit for the rear regenerative braking limit (assumed to be 1,000 ft-lbf) as shown in step 216. Thus, the rear regenerative braking request is 1,000 ft-lbf.

After the front regenerative torque request and the rear regenerative braking requests are calculated, it is determined if the bounded driver braking request less the front regenerative braking request and the rear regenerative braking request is greater than zero. Using the foregoing example values, 6,000 ft-lbf−(1,000 ft-lbf+1,000 ft-lbf)=4,000 ft-lbf, and this value is greater than zero (step 220). Then, it is determined if the rear regenerative torque requested (1,000 ft-lbf) is greater than or equal to the base rear braking amount (2,400 ft-lbf) as shown in step 224. Since it is not, the front friction braking request is the bounded driver braking request (6,000 ft-lbf) multiplied by the front base proportion (60%) less the front regenerative torque requested (1,000 ft-lbf) as shown in step 228. Therefore, the front friction braking request is 2,600 ft-lbf.

The rear friction braking request is the bounded driver braking request (6,000 ft-lbf) less the front regenerative braking request (1,000 ft-lbf) less the rear regenerative braking request (1,000 ft-lbf) less the front friction braking request (2,600 ft-lbf). Thus, the rear friction torque request is 1,400 ft-lbf (6,000 ft-lbf−(1,000 ft-lbf+1,000 ft-lbf+2,600 ft-lbf)=1,400 ft-lbf).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A braking distribution method in a vehicle having a regenerative braking system, comprising:
   receiving a braking request;
   receiving a first amount of braking that is available from front regenerative braking;
   receiving a second amount of braking that is available from rear regenerative braking;
   calculating a front base braking based at least in part on the braking request and a front base braking distribution;
   calculating a rear base braking based at least in part on the braking request and a rear base braking distribution;
   determining a front regenerative braking request based on the first amount of braking and the front base braking; and
   determining a rear regenerative braking request based on the second amount of braking and the rear base braking;
   allocating, if the rear regenerative braking request is equal to or exceeds the rear base braking, a front friction braking request equal to the result of the braking request less the front regenerative braking request and the rear regenerative braking request; and
   allocating, if the rear regenerative braking request is less than the rear base braking, a front friction braking request equal to the result of the braking request multiplied by the front base braking distribution less the front regenerative braking request; and allocating as a rear friction braking request the braking request less the front regenerative braking request less the rear regenerative braking request and less the front friction braking request.

2. The method of claim 1 wherein the step of determining a front regenerative braking request farther comprises selecting a minimum of the first amount of braking or an overall limit for front regenerative braking, if the first amount of braking is less than or equal to the front base braking.

3. The method of claim 1 wherein the step of determining a front regenerative braking request further comprises selecting the minimum of a front regenerative lookup table amount, the first amount of braking, or an overall limit for front regenerative braking, if the first amount of braking is greater than the front base braking.

4. The method of claim 1 wherein the step of determining a rear regenerative braking request further comprises selecting the minimum of the braking request less the front regenerative braking request, the second amount of braking or an overall ceiling for rear regenerative braking, if the second amount of braking is less than or equal to the rear base braking.

5. The method of claim 1 wherein the step of determining a rear regenerative braking request further comprises selecting the minimum of the braking request less the front regenerative braking request, a rear regenerative lookup table amount, the second amount of braking or an overall ceiling for rear regenerative braking, if the second amount of braking is greater than the rear base braking.

6. A braking distribution system, comprising:
   a regenerative braking system configured to receive a front regenerative braking request and a rear regenerative braking request;
   a brake controller coupled to the regenerative braking system, said brake controller configured to:
   receive a braking request;
   receive a first amount of braking that is available from front regenerative braking;
   receive a second amount of braking that is available from rear regenerative braking;
   calculate a front base braking based at least in part on the braking request and a front base braking distribution;
   calculate a rear base braking based at least in part on the braking request and a rear base braking distribution;
   determine a front regenerative braking request based on the first amount of braking and the front base braking;
   determine a rear regenerative braking request based on the second amount of braking and the rear base braking and by multiplying a rear base braking proportion by the braking request, wherein the rear regenerative braking request is determined by:
      selecting the minimum of the braking request less the front regenerative braking request the second amount of braking, or an overall ceiling for rear regenerative braking, if the second amount of braking is less than or equal to the rear base braking; and
      selecting the minimum of the driver braking request less the front regenerative braking request, the second amount of braking, a rear regenerative lookup table amount, or an overall ceiling for rear regenerative braking, if the second amount of braking is greater than the rear base braking;
   transmit the front regenerative braking request; and
   transmit the rear regenerative braking request.

7. The system of claim 6 wherein the braking request is determined based on bounding a braking input from an operator using an upper and lower bound for a given vehicle.

8. The system of claim 6 wherein the front base braking is determined by multiplying the front base braking proportion by the braking request.

9. The system of claim 8 wherein the front regenerative braking request is determined by selecting the minimum of the first amount of braking or an overall ceiling for front regenerative braking, if the first amount of braking is less than or equal to the front base braking.

10. The system of claim 8 wherein front regenerative braking request is determined by selecting the minimum of a front regenerative lookup table amount, the first amount of braking or an overall limit for front regenerative braking, if the first amount of braking is greater than the front base braking.

11. The system of claim 7 wherein the regenerative braking system is coupled to a set of rear wheels, to a set of front wheels or to all wheels, and the front regenerative braking request, the rear regenerative braking request or both front regenerative braking request and rear regenerative braking request are equal to zero.

12. A method for distributing braking torque in a regenerative braking system comprising:
determining a braking request using a brake sensor output value referenced against a bounded braking curve;
receiving a braking request, an available front regenerative braking and an available rear regenerative braking;
fulfilling the driver braking request by first using the regenerative braking system to:
provide a front regenerative braking request as a minimum of the available front regenerative braking, a front regenerative lookup table amount or an overall ceiling for front regenerative braking;
provide a rear regenerative braking request as a minimum of the available rear regenerative braking, the braking request less the front regenerative breaking request or an overall ceiling for rear regenerative braking; and
if the front regenerative braking request and the rear regenerative braking request do not fulfill the driver braking request:
allocating as a front friction braking request any remaining braking request and allocating no torque as the rear friction braking request, if the rear regenerative braking request is greater than or equal to a rear base braking; and
allocating as a front friction braking request the front base braking amount remaining after supplying the front regenerative braking request and the rear regenerative braking request and allocating as a rear friction braking request any remaining driver braking request if the rear regenerative braking request is less than the rear base braking amount;
wherein the step of determining a rear regenerative braking farther comprises:
determining a rear base braking amount by allocating a predetermined base braking proportion between front brakes and rear brakes;
selecting the minimum of the braking request less the front regenerative braking amount, the available rear regenerative braking or an overall ceiling for rear regenerative braking, if the available rear regenerative braking is less than or equal to the base rear braking; and
selecting the minimum of the braking request less the front regenerative braking request a rear regenerative lookup table amount, the available rear regenerative braking or the overall ceiling for rear regenerative braking, if the available rear regenerative braking is greater than the rear base braking.

13. The method of claim 12 wherein the step of determining a front regenerative braking request further comprises:
determining a front base braking amount by allocating a predetermined base braking proportion between front brakes and rear brakes;
selecting the minimum of the front regenerative lookup table amount or an overall limit for front regenerative braking as the front regenerative braking request, if the available front regenerative braking is greater than the front base braking; and
selecting the minimum of the available front regenerative braking or an overall limit for front regenerative braking, if the available front regenerative braking is less than or equal to the front base braking.

* * * * *